US007542373B2

United States Patent
Wang

(10) Patent No.: US 7,542,373 B2
(45) Date of Patent: Jun. 2, 2009

(54) VECTOR 3-COMPONENT 3-DIMENSIONAL KIRCHHOFF PRESTACK MIGRATION

(75) Inventor: Dapeng Wang, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/972,880

(22) Filed: Oct. 25, 2004

(65) Prior Publication Data

US 2005/0135189 A1    Jun. 23, 2005

Related U.S. Application Data

(60) Provisional application No. 60/576,526, filed on Jun. 3, 2004, provisional application No. 60/515,107, filed on Oct. 28, 2003.

(51) Int. Cl.
*G01V 1/28* (2006.01)
*G01V 1/34* (2006.01)
*G01V 1/40* (2006.01)

(52) U.S. Cl. .............. 367/27; 367/28; 367/56; 367/57

(58) Field of Classification Search .......... 367/25, 367/27, 28, 38, 50, 57, 56; 181/108
See application file for complete search history.

(56) References Cited

U.S. PATENT DOCUMENTS

| | | | | |
|---|---|---|---|---|
| 4,627,036 A | | 12/1986 | Wyatt ............... | 367/57 |
| 4,635,238 A | * | 1/1987 | Gallagher et al. .......... | 367/57 |
| 4,802,147 A | * | 1/1989 | Moeckel ............... | 367/57 |
| 4,809,239 A | * | 2/1989 | Esmersoy ............... | 367/57 |
| 4,893,694 A | * | 1/1990 | Houck et al. ............ | 367/38 |
| 4,918,670 A | * | 4/1990 | Wang ................. | 367/38 |
| 5,062,086 A | * | 10/1991 | Harlan et al. ............ | 367/38 |
| 5,111,437 A | * | 5/1992 | Rice .................. | 367/57 |
| 5,142,501 A | * | 8/1992 | Winterstein ............ | 367/75 |
| 5,790,473 A | * | 8/1998 | Allen ................. | 367/57 |
| 6,002,642 A | * | 12/1999 | Krebs ................. | 367/50 |
| 6,076,045 A | | 6/2000 | Naville ............... | 702/10 |
| 6,081,482 A | * | 6/2000 | Bevc ................. | 367/57 |
| 6,131,694 A | * | 10/2000 | Robbins et al. .......... | 367/57 |
| 6,292,754 B1 | | 9/2001 | Thomsen .............. | 702/14 |
| 6,553,315 B2 | * | 4/2003 | Kerekes et al. .......... | 702/14 |
| 6,625,544 B1 | * | 9/2003 | Laurent et al. .......... | 702/17 |

(Continued)

OTHER PUBLICATIONS

Gulati, et al. "3C-3D VSP: The Blackfoot experiment." Crewes Research Report—vol. 10 (1998).*

(Continued)

*Primary Examiner*—Jack W. Keith
*Assistant Examiner*—Scott A Hughes
(74) *Attorney, Agent, or Firm*—Madan, Mossman & Sriram, P.C.

(57) ABSTRACT

An apparatus and a method for migration of three components, 3-Dimensions seismic (3-C, 3-D) data acquired by down-hole receivers and surface seismic sources. This method utilizes full 3 components reflection wave field. It uses a dynamic, vector energy mapping method to image a reflection position and maps each time sample only to its reflected image point. Therefore, this method reduces unwanted data smearing and false mirror images. This method overcomes the weakness of using only a single component trace or pre-rotated three-component traces in the 1-C or 3-C 3-D VSP migration and produces better 3-D image.

14 Claims, 14 Drawing Sheets

U.S. PATENT DOCUMENTS

| | | | |
|---|---|---|---|
| 6,748,330 B2 * | 6/2004 | Leaney | 367/57 |
| 6,807,489 B2 * | 10/2004 | Naville et al. | 702/17 |
| 6,868,038 B2 * | 3/2005 | Leaney | 367/57 |
| 6,950,786 B1 * | 9/2005 | Sonneland et al. | 703/2 |
| 2002/0128779 A1 * | 9/2002 | Kerekes et al. | 702/14 |
| 2003/0021184 A1 | 1/2003 | Zhang | 367/14 |

OTHER PUBLICATIONS

Rex, et al. "Rosemary 3C3D: An AVO, VSP, and Converted Wave Case Study." CSEG Geophysics, 2002.*

Chen et al.; *Rapid VSP-CDP mapping of 3-D VSP data*, Geophysics, XP-002322368, vol. 65, No. 5 (Sep.-Oct. 2000), pp. 1631-1640, 11 Figs., 2 Tables.

Bicquart; *Application of Kirchhoff Depth Migration to 3D-VSP*, XP-002322369, 1998 SEG Expanded Abstracts, 9 Figs.

Constance et al.; *Simultaneous Acquisition of 3-D Surface Seismic Data and 3-C, 3-D VSP Data*, XP-002322370, 1999 SEG Expanded Abstracts, 8 Figs.

Guzman et al.; *Seismic tomography using borehole experiments: Examples from Mars and Auger in the deepwater Gulf of Mexico*, XP-000750373. The Leading Edge, Feb. 1998, 12 Figs.

* cited by examiner

VECTOR 3-COMPONENT 3-DIMENSIONAL KIRCHHOFF PRESTACK MIGRATION

CROSS-REFERENCES TO RELATED APPLICATIONS

This application claims priority from U.S. Provisional Patent Application Ser. No. 60/515,107 filed on Oct. 28, 2003 and U.S. Provisional Patent Application Ser. No. 60/576,526 filed on Jun. 3, 2004.

BACKGROUND OF THE INVENTION

1. Field of the Invention

This invention relates to a method of geophysical prospecting which improves the accuracy of seismic migration. Specifically, the invention uses offset or zero-offset survey measurements to accurately migrate reflectors present in three-dimensional (3-D) surface seismic data, in Vertical Seismic Profiles (VSPs), and in cross-well seismic survey data.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflector using a procedure known as migration.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver. In particular, due to the two-way passage of seismic signals through a highly absorptive near surface weathered layer with a low, laterally varying velocity, subsurface images may be of poor quality. To overcome this difficulty, a technique commonly known as Vertical Seismic Profiling (VSP) was developed to image the subsurface in the vicinity of a borehole. In a VSP, a surface seismic source is used and signals were received at a downhole receiver or an array of downhole receivers. This is repeated for different depths of the receiver (or receiver array). In offset VSP, a plurality of spaced apart sources are sequentially activated, enabling imaging of a larger range of distances than is possible with a single source.

The VSP data acquisition may be performed by conveying the receivers downhole on a wireline after drilling of the well has been partially or fully completed. An advantage of the VSP method is that the data quality can be much better than in surface data acquisition. The VSP acquisition may also be done by conveying the receiver array downhole as part of the bottomhole assembly (BHA). This is referred to as VSP while drilling.

U.S. Pat. No. 4,627,036 to Wyatt et. al., the contents of which are fully incorporated herein by reference, gives an early example of the VSP method. Referring now to FIG. 1, there is illustrated a typical VSP configuration for land seismic acquisition. In the exemplary figures, a Vibroseis® source 11 is illustrated as imparting energy into the earth. It is noted that any other suitable seismic source such as explosives could be utilized if desired. In a marine environment, the source could be an airgun or a marine vibrator.

A receiver 12 is shown located at a desired depth in the borehole 14. For the location of the receiver 12, energy would be reflected from the subsurface strata 15 at point 16. The output produced from receiver 12 is recorded by the recording truck 17. In VSP, the receiver 12 would typically be moved to a new location for each shot with the distance between geophone locations being some constant distance such as 50 feet. If desired, an array of receivers spaced apart by some desired distance could be utilized or a plurality of sources spaced apart could be used.

Data obtained by VSP has the appearance of that illustrated in FIG. 2. Wyatt discusses the use of a processing technique called the VSP-CDP method by which VSP data such as those shown in FIG. 2 may be stacked to produce an image of the subsurface of the earth away from the well.

The process of migration of surface seismic data has been used for obtaining images of the subsurface that are better then those obtainable with the CDP or stacking method. In migration, the objective is to position seismic reflections at their proper spatial position: in the surface CDP method, on the other hand, it is assumed that reflections originate from a reflection point midway between the source and the receiver. A commonly used method for migration is the Kirchhoff method in which a velocity model is defined for the subsurface. Traveltimes are computed from the source to a diffraction point and from a diffraction point to the receiver. The actual image of a reflector is obtained by combining data from a plurality of source-receiver pairs to a plurality of imaging points. If the velocity model is reasonably accurate, the signals will interfere constructively at the correct image point. This concept was originally developed for surface seismic data. Wiggins (1984) extended the use of migration to cases where the observation surface is not limited to being a flat horizontal plane. The use of Kirchhoff migration for VSP data has been discussed by Dillon.

The teachings of Dillon are limited to 2-D migration. More recently, VSP Kirchhoff depth migration has been used for 3-D VSP data by Bicquart. As noted by Bicquart, Kirchhoff and other wide angle migration methods are sensitive to velocity error. Velocities are difficult to obtain accurately in surface reflection seismology thus limiting the effectiveness of Kirchhoff migration in structures associated with steep dips. In contrast to surface seismic acquisition, in VSP reasonably accurate velocities can be obtained accurately from the well survey. With good velocity depth information, Kirchhoff depth migration produces a better 3-D depth image in the well vicinity. However, in offset 2-DVSP and 3-DVSP source and receiver are not symmetric with respect to the subsurface imaging points. This asymmetry requires considerable effort in computing weighting factors.

In parallel with the improvements in seismic data processing, particularly migration techniques, there has been continued development of a rather fundamental nature in the kind of data acquired. In recent years, multicomponent seismic data has formed an increasing part of the total amount of seismic data acquired. The reason for this has been the recognition that conventional, single component seismic data is primarily responsive to compressional wave energy in the vertical direction in the subsurface. The conventional data is most commonly acquired with a compressional wave source and hydrophone detectors in a marine environment, or a vertical source and a vertical detector in land seismic acquisition. Additional information indicative of lithology and fluid content of the subsurface is obtainable from knowledge about the propagation of shear waves in the subsurface. Shear wave arrivals are most conveniently detected by receivers with other orientations than vertical. An additional advantage of multicomponent recording is that, even for compressional energy, knowledge of three components of a received signal can provide an indication of the direction from which energy is received at the receiver, and total amount of energy in that direction.

Hokstad has derived equations for prestack multicomponent Kirchhoff migration. The imaging equations are derived with basis in viscoelastic wave theory. The mathematical structure of the multicomponent imaging equation derived by Hokstad allows for computation of separate images for all combinations of local incident and scattered wavemodes (qP-qP, qP-qS1, qS1-qS1, etc.).

A limitation of the teachings of Hokstad is that they do not address the real world problem of 3-D seismic imaging. While the results derived by Hokstad are quite elegant, the examples are limited to 2-D data and do not offer any practical suggestion of dealing with 3-D multicomponent data. The problem of migration of 3-D multicomponent data is addressed in the present invention.

SUMMARY OF THE INVENTION

The present invention is a method of imaging subsurface earth formations. A seismic source is activated at one or more source positions and seismic waves are generated into the earth formation. Three component (3-C) seismic data are obtained at one or more receiver positions. The received seismic data contains information about the 3-D structure of the earth. A 3-D Kirchhoff migration of the 3-C data is done. In the Kirchhoff migration, traveltimes from each source position to a plurality of image points, and from each of the plurality of image points to each of the receiver positions are used. The sources and receivers may be at the surface or at a downhole location. Typically, the three components are substantially orthogonal to each other. In a wireline implementation, the receivers for the three components may be gimbal mounted. When used in a MWD environment, the receivers may be mounted on a non-rotating sleeve that can be clamped to the borehole wall. The receivers may be geophones or accelerometers.

The 3-D migration procedure includes forward modeling and imaging operations. The forward modeling is to compute the seismic wave traveltime and wave-(ray) direction angles at each image grid in the 3-D space within a proposed velocity model. These traveltime and ray-direction angles are computed for each source and receiver location. The traveltimes may be for compressional waves or for shear waves.

The imaging operation sums the recorded reflected seismic wave energies to their reflected locations using a weighting factor. The weighting factor is a function of ray geometry, wave traveltime, source-receiver aperture, wavelet phase and other factors. The traveltimes are used to locate the amplitude (reflected energy) in the recorded traces. The output image amplitude of the migration is a scale value which represents the geophysical reflectivity.

The imaging operations may be performed by an onsite processor. Alternatively, processing may be done at a time different from the acquisition at a remote location. Data from the wellsite may be sent to the remote location by any suitable means, including a satellite link or by an Internet connection. The instructions enabling the processor to access the multicomponent seismic data and perform the 3C-3D migration processing may reside on a machine readable memory device. These instructions enable the processor to access the data and to process the data.

BRIEF DESCRIPTION OF THE DRAWINGS

The present invention is best understood by reference to the attached figures in which like numerals refer to like elements, and in which:

FIG. 7b shows synthetic 3-C traces for the model of FIG. 7a;

DETAILED DESCRIPTION OF THE INVENTION

Figure 1:
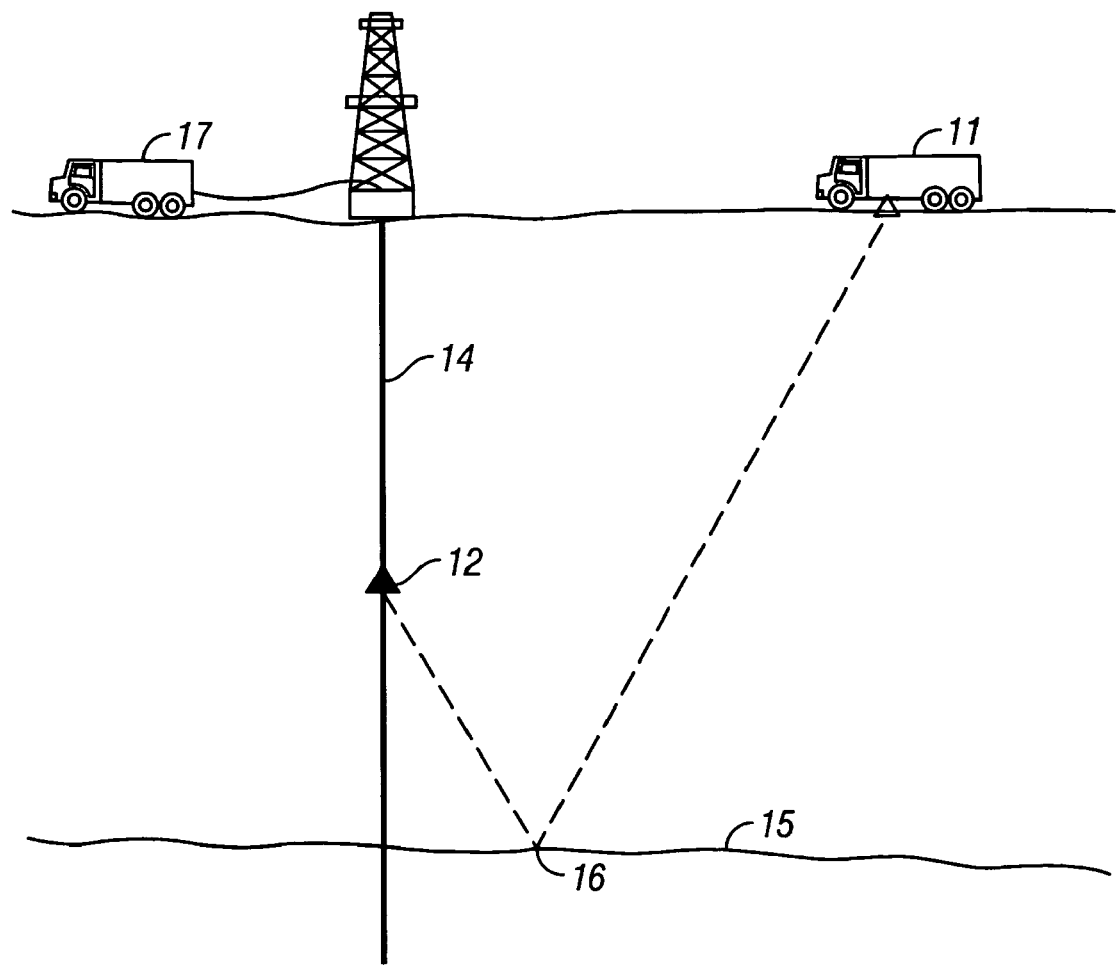
FIG. 1 (Prior Art) is a typical field geometry for the acquisition of VSP seismic data.
Figure 2:
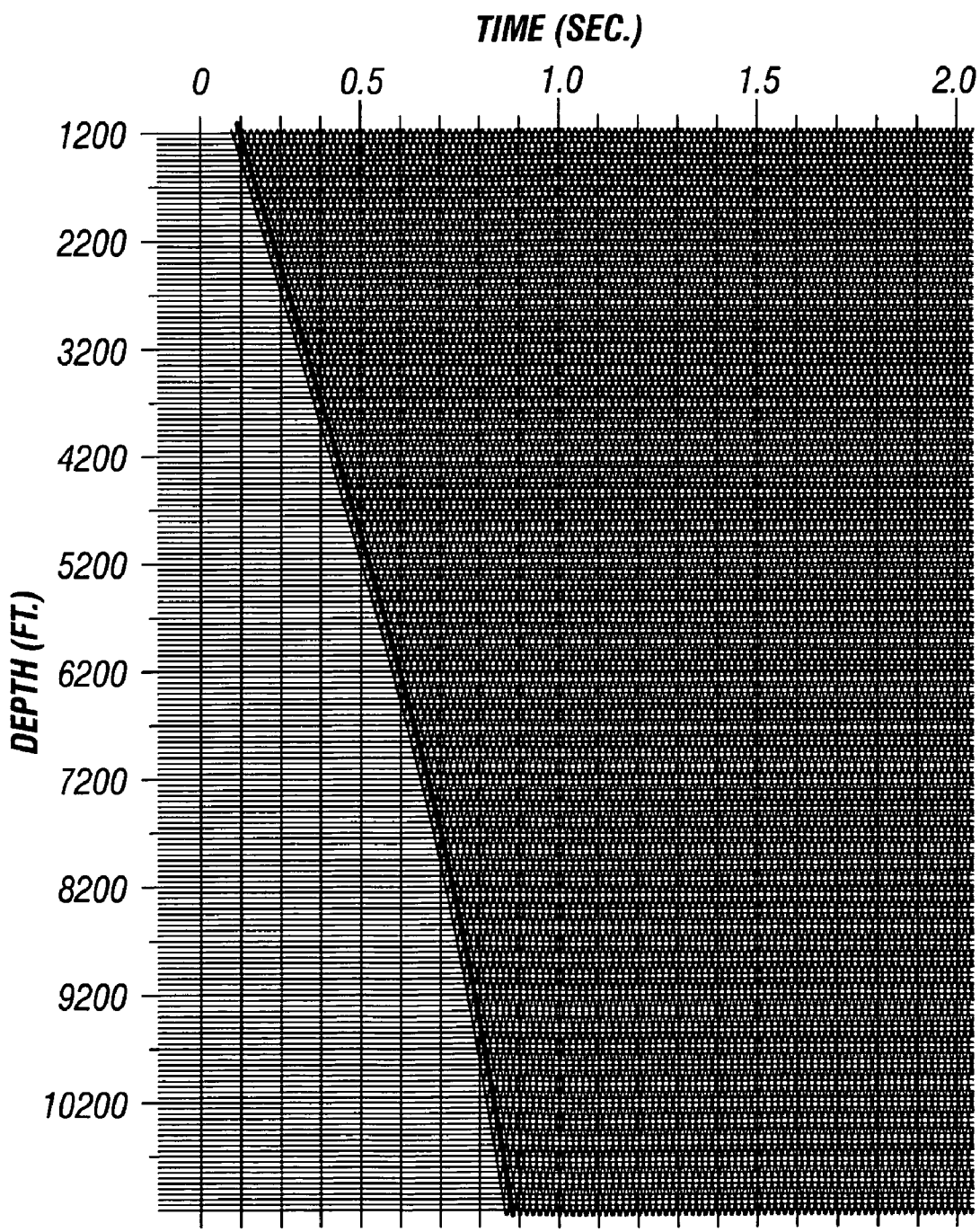
FIG. 2 (prior art) is an illustration of actual VSP seismic data.

For the present invention, a modified version of the prior art system shown in FIG. 1 is used. The receiver 12 comprises an array of spaced apart receivers. Typically, 5-80 receivers are used. Each receiver comprises a three-component (3-C) receiver. In one embodiment of the invention, the three components are labeled H1, H2 and Z components, the Z component being vertical, and the H1 and H2 axes are orthogonal to the Z axis and orthogonal each other. The receivers may be gimbal mounted. This facilitates use of the receivers in a deviated borehole. With such an arrangement, the mechanical construction of the horizontal component receivers is usually different from the mechanical construction of the Z component receiver due to the fact that the latter has gravity acting along the direction of motion of the receivers. Either geophones or accelerometers may be used. In an alternate embodiment of the invention, the three receivers are substantially identical in sensitivity and are oriented along the vertices of a tetrahedron. Orientation of the receivers is determined using any of the methods known in prior art.

A basic part of the processing is the use of a 3-C 3-D vector Kirchhoff prestack migration. This is discussed prior to the implementation of the migration itself. The 3-D prestack Kirchhoff migration is generally expressed as $$M(x) = \sum_{x_s, x_r} W(x_s, x_r, x) P_{sr}(t_s(x_s, x) + t_r(x, x_r)) \quad (1)$$

Here, M(x) is the migrated image point at 3-D location x. $W(x_s, x_r, x)$ represents a weighting factor, or amplitude compensation function which relates to the survey geometry, velocities along the raypath, and the geophone aperture. $x_s$ and $x_r$ are the source and receiver locations in 3-D. $W(x_s, x_r, x)$ is independent of the recorded reflection wavefield $P_{sr}(t_s, x) + t_r(x, x_r)$, where $t_s(x_s, x)$ and $t_r(x, x_r)$ are traveltimes from the source to the image position and from the image position to the receiver. The recorded wavefield $P_{sr}$ is a superposition of scattered energy which satisfies the condition that recording time $t = t_s(x_s, x) + t_r(x, x_r)$ is constant for a source-receiver pair. The migration process redistributes the recorded reflection energy at time t to an ellipsoidal (in a constant velocity background, for simplicity) surface where a reflector may exist. The migrated image at each position x is a superposition of weighted energies $WP_{sr}$ of all the ellipsoid surfaces at x for each source $x_s$ to each receiver $x_r$. The conventional 3-D prestack Kirchhoff migration maps the energy at t non-directionally, meaning that the migration operator evenly distributes equal amplitude to all points on the ellipsoid. As noted above, the conventional Kirchhoff migration does not take into consideration the direction from which the energy as reflected from. This property will cause false mirror image reflections to be produced. Using a vector term allows the vector 3-C, 3-D Kirchhoff migration to overcome this problem. The recorded wavefield $P_{sr}$ used in migration is a scalar one component data or rotated to a fixed direction of the three components data. The total reflection wavefield is not used.

The vector 3-C, 3-D Kirchhoff prestack migration (V3D migration) is based on the conventional Kirchhoff integration given by eq. (1). The principal difference is the migration operator. The V3D migration treats the reflection wavefield at each time sample t as a 3-D wavefield vector, rather than a scalar value as in conventional 3-D Kirchhoff migration. An incoming ray vector (wave front normal) is introduced to the equation. It is a unit vector which represents the ray direction at the receiver from the reflected image point. When constructing the image at location x using the wavefield $P_{sr}(t_s(x_s, x) + t_r(x, x_r))$, we use only the wavefield data which originated from x. The directional information is determined using dynamic polarization analysis of the 3-component input data. Assuming that the reflection wavefield vector at t is $\vec{P}_{sr}(t)$ and the unit ray vector at location $x_r$ is $\vec{R}(x, x_r)$, then the migration equation (1) becomes $$M(x) = \sum_{x_s, x_r} W(x_s, x_r, x) A(x_s, x_r, x), \quad (2)$$

where $$A(x_s, x_r, x) = \vec{R}(x, x_r) \cdot \vec{P}_{sr}(t_s(x_s, x) + t_r(x, x_r)) \quad (3)$$

$A(x_s, x_r, x)$ is the new migration operator. The weighing factor $W(x_s, x_r, x)$ is unchanged.

Figure 3A:
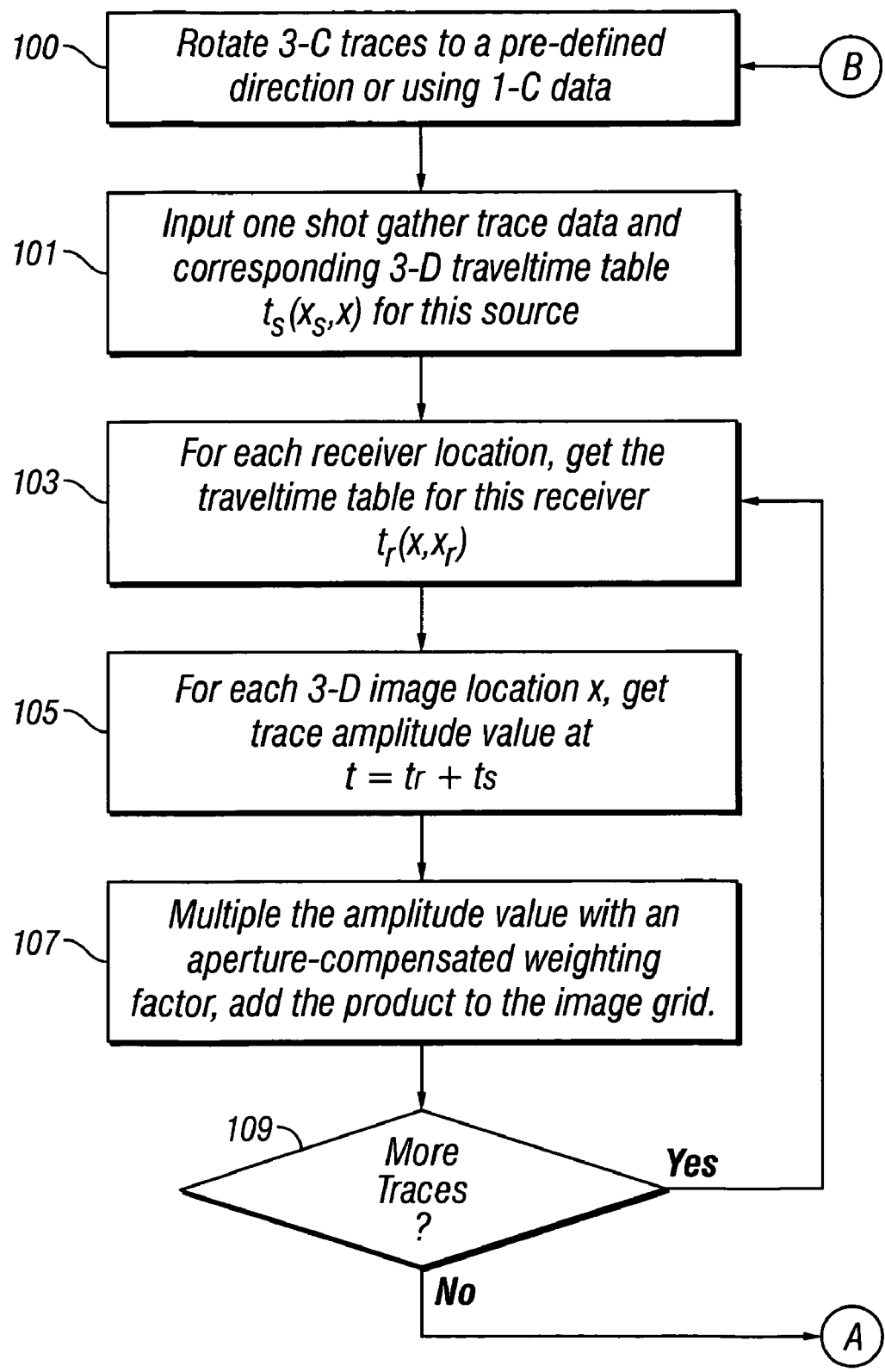
FIGS. 3a and 3b show a block diagram depicting operations carried out in one embodiment of the present invention.
Figure 3B:
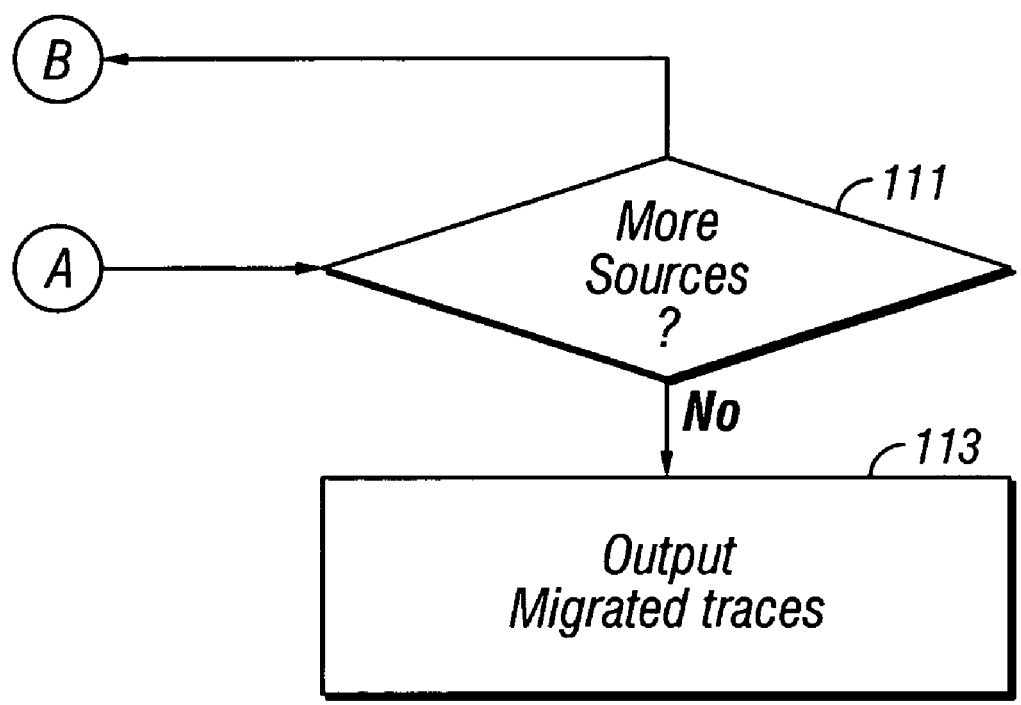

Processing of the data is accomplished using a first embodiment of the invention using equation (1) is illustrated in FIGS. 3a and 3b. The 3-C seismic data are rotated to a pre-defined direction and becomes 1-C data or input any 1-C (mostly vertical component) data into the migration processing.

The 3-D traveltime tables for each source and receiver position are generated 101 using a velocity model for the subsurface. For one method discussed with reference to FIGS. 3a-3b, the seismic data is pre-rotated into a direction generally corresponding to the receiver-to-source direction 100. This may be referred to hereafter as the conventional method. The travel time tables for each receiver position are generated 103. For each 3-D spatial image location x, integrations of the amplitude with a weighting factor are carried out over all source-receiver pair. The amplitude is the trace value at the total travel time $t=t_s(x_s, x)+t_r(x, x_r)$ of each source-receiver pair. The weighting factor includes phase correction, ray trace geometry correction, source-receiver aperture correction, and other energy-lose related factors. The migrated image at each grid point is the summation result of the above integrations 113 after all contributions of the traces have done (109, 111).

Figure 4B:
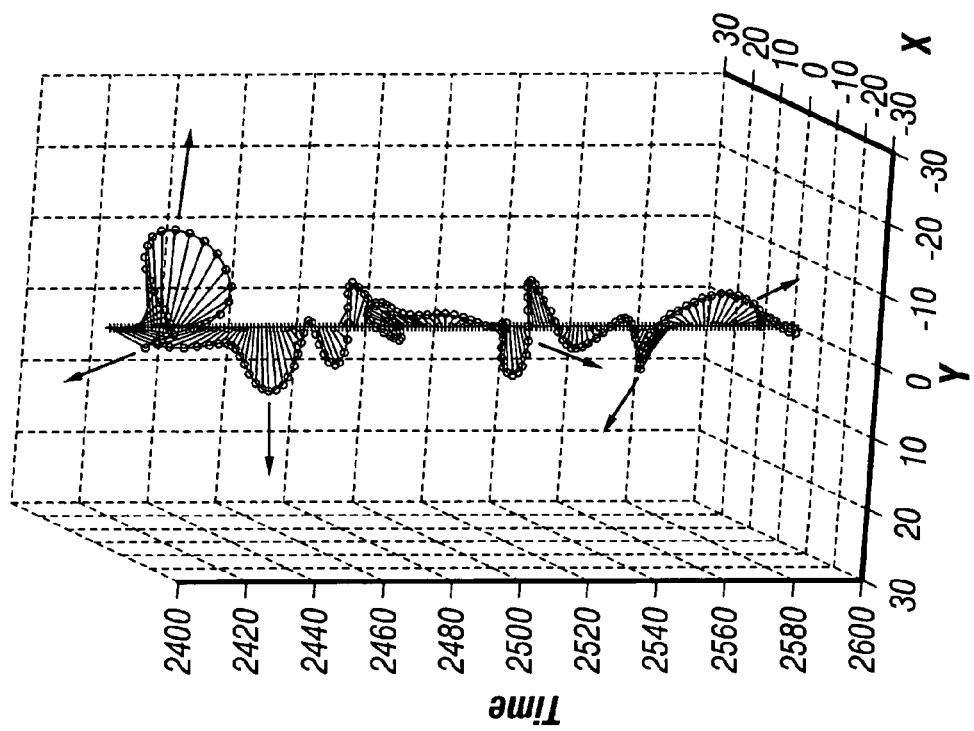
FIG. 4b is the data of FIG. 4a in a 3-D display.
Figure 4A:
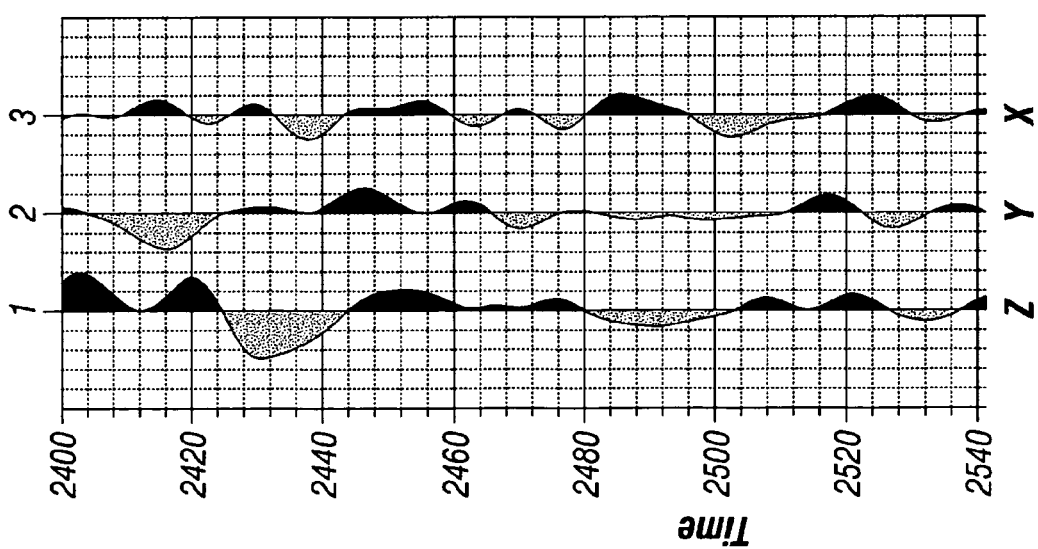
FIG. 4a displays a typical 3-C seismic data in x, y, z components.

The method of processing 3-C 3-D data discussed above has several drawbacks discussed next. First, the 3-C reflection data contains the energy from all directions and comprises vectors at each recording sample time at each receiver location in a 3-D space as shown in FIG. 4a-b. Using single component data or rotating the data rotated in a specified direction will eliminate the energy from all other directions in the migration. This results in incomplete migration image. Secondly, algebraic summation of individual component migration results or using algebraically summed individual component data into the migration is incorrect. Thirdly, the received reflection energy is directional and should be directionally distributed to its reflected direction. Equally distributing the reflection energy in all azimuths will produce false mirror images.

Figure 5:
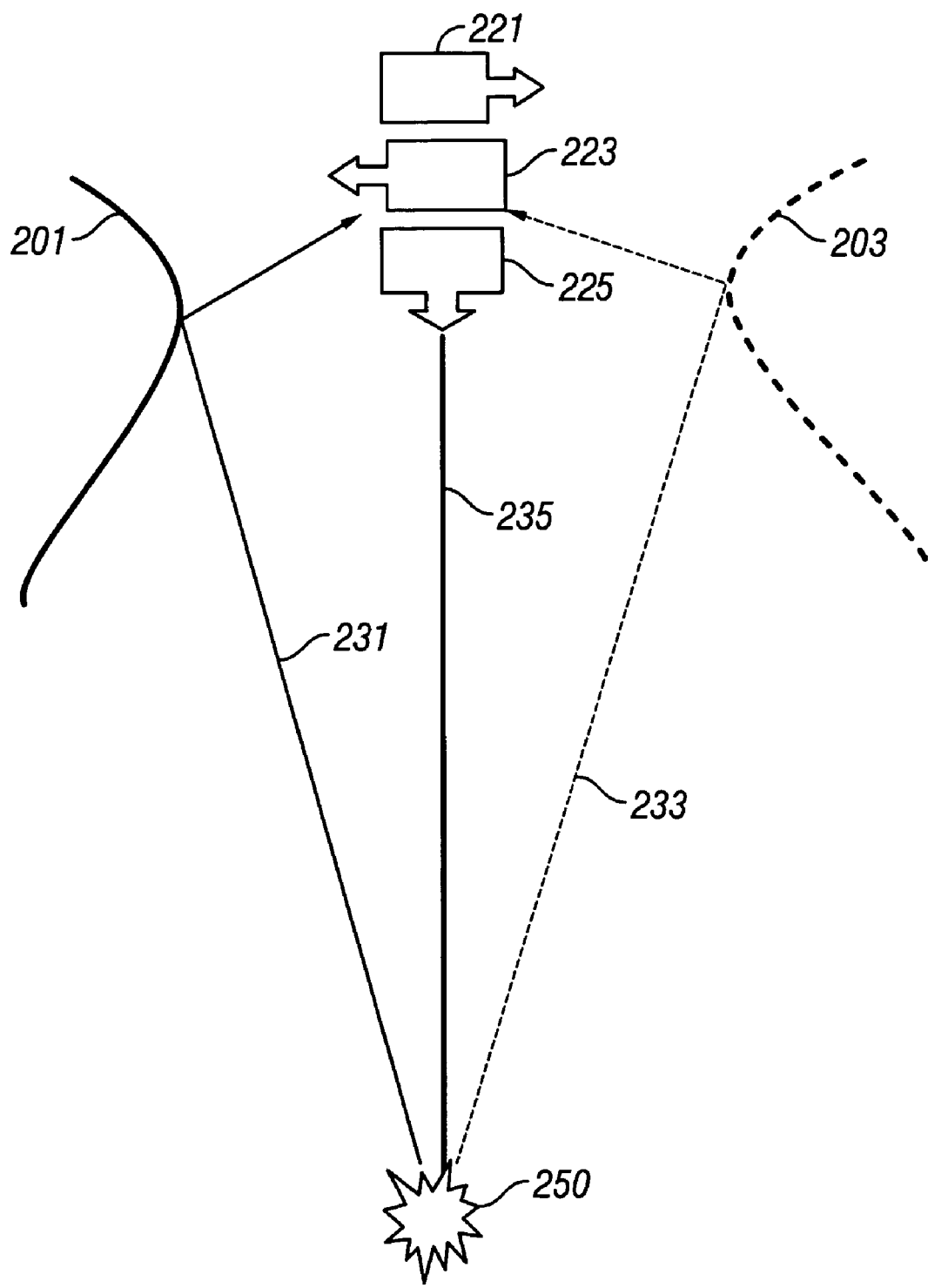
FIG. 5 illustrates a drawback of the method of FIGS. 3a and 3b.

FIG. 5 shows the problem of false mirror images with the method of processing shown in FIGS. 3a-3b. Shown in FIG. 5 is a plan view of a 3-C, 3-D VSP acquisition geometry. The source is shown at 250 and the three component receivers are depicted schematically by 221, 223 and 225. Shown by 231 is a raypath for seismic energy that propagates from the source 250, is reflected at a true structure shown by 201 and travels to the receivers 221, 223 and 225. With the method described above, assuming we use the reflection data from receiver component 221, the reflection energy is equally distributed to both location 201 and 203. 203 is a false reflector. The reason is that the traveltime from 250 to 201 and from 201 to 221 equals to the traveltime from 250 to 203 and from 203 to 221. The energy distribution is non-directionally in the conventional first migration method. Similar results are obtained using any rotated or un-rotated single component data.

Figure 6A:
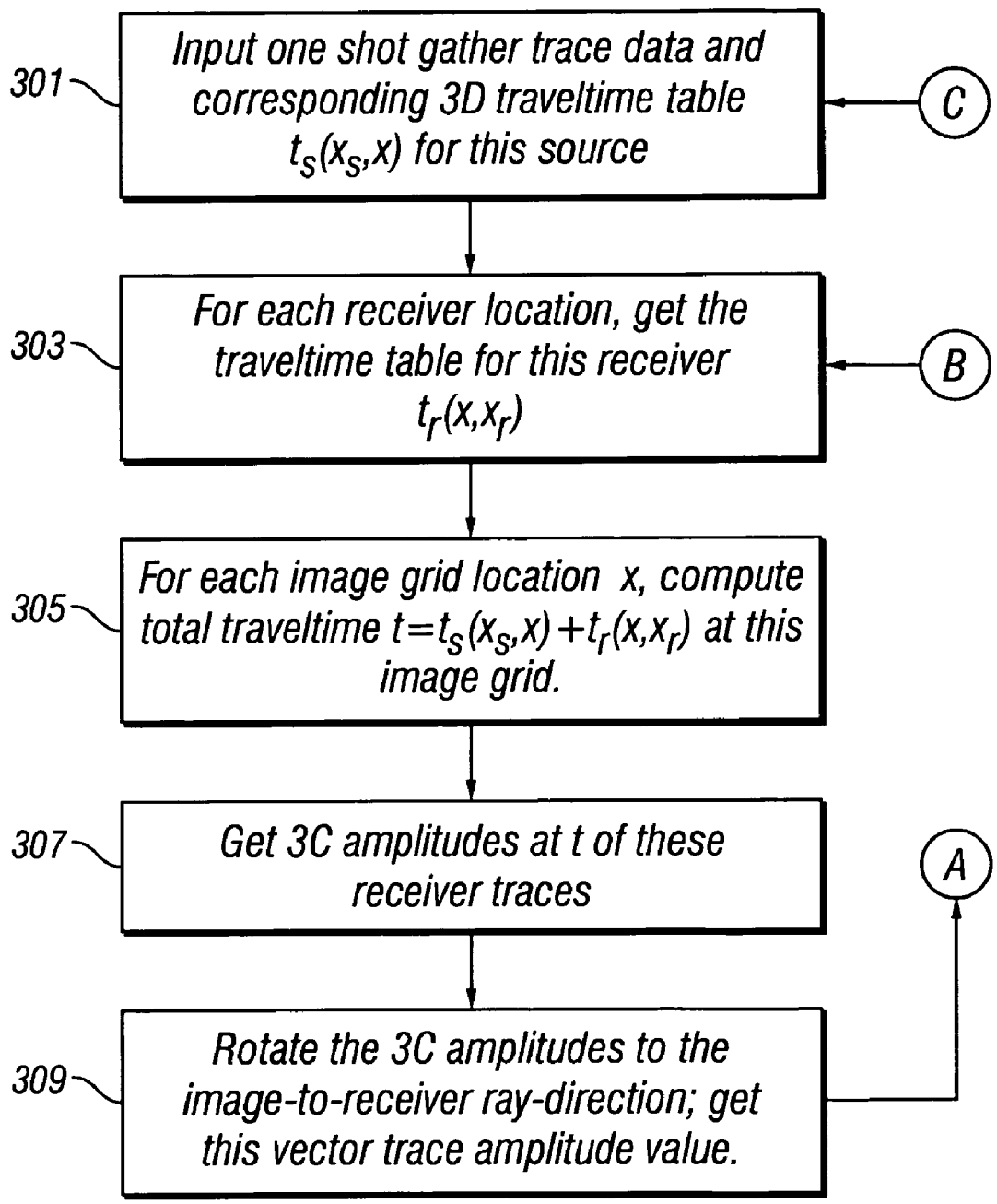
FIGS. 6a and 6b show a block diagram depicting operations carried out in a second embodiment of the present invention.
Figure 6B:
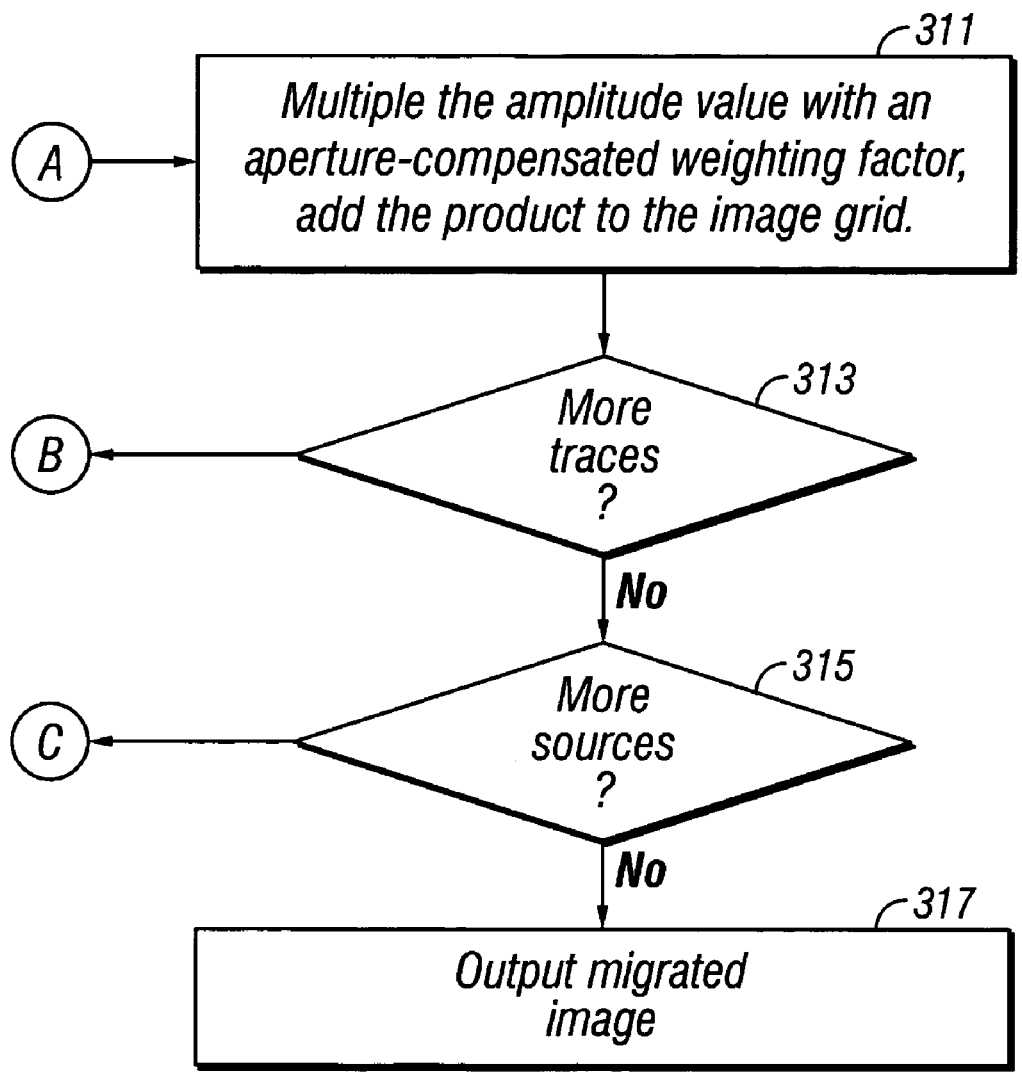

To address the problem discussed above, a second embodiment of the invention migrates the 3-C data in a vector form and rotate the 3-C data dynamically. This is shown in FIGS. 6a-6b. As in the first embodiment of the invention, data from a single shot are gathered and the corresponding traveltime values $t_s(x_s, x)$ for this source are obtained 301 by forward modeling from the velocity model (or retrieving from memory). The traveltimes are obtained for each output location x in the 3-D volume. Next, the traveltime values are obtained $t_r(x, x_r)$ 303 for a selected receiver location to the grid of desired output image points x in the 3-D volume. For each image grid location point x, the total traveltime from the source to the receiver is $t=t_s(x_s, x)+t_r(x, x_r)$. Three component amplitudes are obtained for these traces at t 307. The 3-C data are rotated to the image-to-receiver ray-direction 309. It is, of course, necessary to keep in mind that the ray direction usually corresponds to the direction of maximum amplitude for a P-wave, whereas for shear waves, the ray direction will usually be orthogonal to the direction of maximum amplitude. Amplitude and phase corrections are applied to the trace and the product is added to the image grid 311. Not shown in FIG. 6*a* but implicit in the Kirchhoff migration is that the processing is done for a plurality of image points on an image grid.

A check is made to see if there are more traces. If so, the process goes back to 303. If there are no more traces for this particular source position, a check is made to see if there are more source positions 315. If there are more source positions, processing goes back to 301. If there are no more source positions, the migrated image is output 317. Additional modes are then processed using substantially the same methodology.

The methodology discussed above may be implemented taking into account anisotropy in the velocity fields for the compressional and shear waves. The traveltime computation then is done using the anisotropic velocities.

More discussions of ray directions and the particle motion directions is given, for example, in a classic paper by Postma. One embodiment of the present invention performs the 3-C, 3-D imaging for transversely isotropic media. A slightly more complicated situation arises when azimuthal anisotropy (due to stress or fracturing) is superimposed on a TI medium. For such a medium, the elastic tensor has orthorhombic symmetry. The most general types of earth formations have more complicated elastic tensors. While in theory it is possible to do raytracing through such media, (see, for example, Crampin) formulation of the elastic tensor is problematic.

Figure 7B:
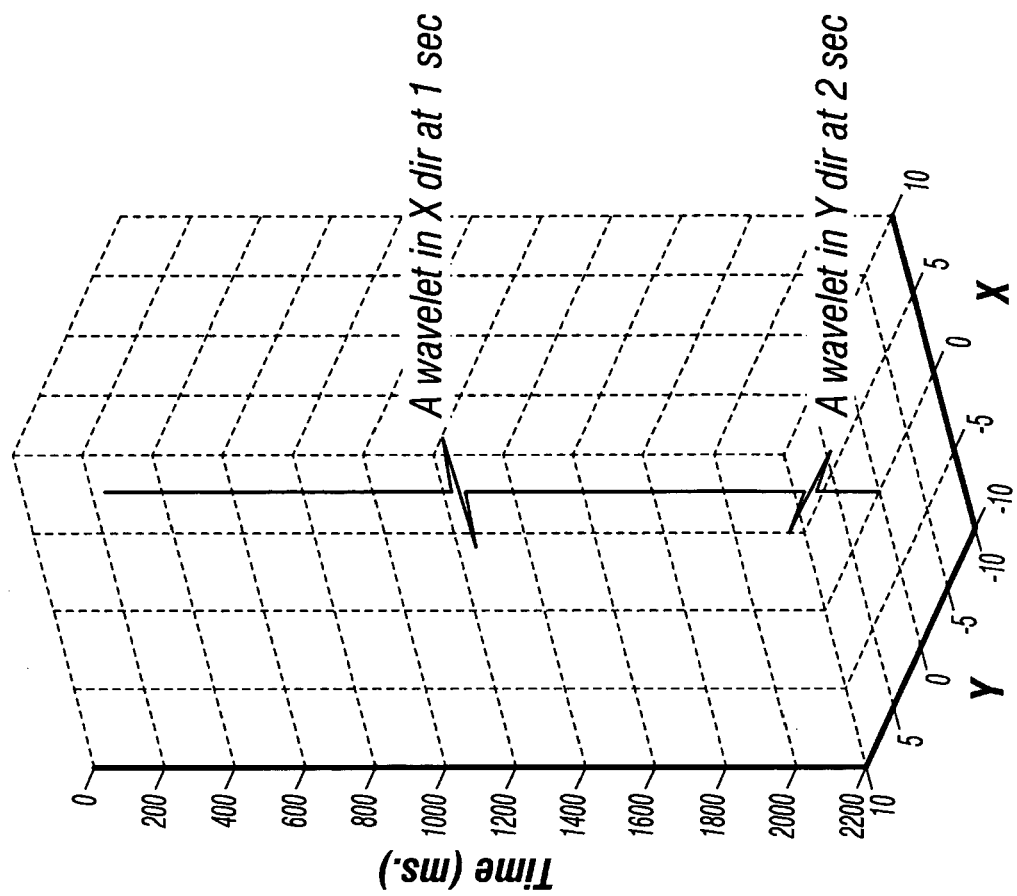
Figure 7A:
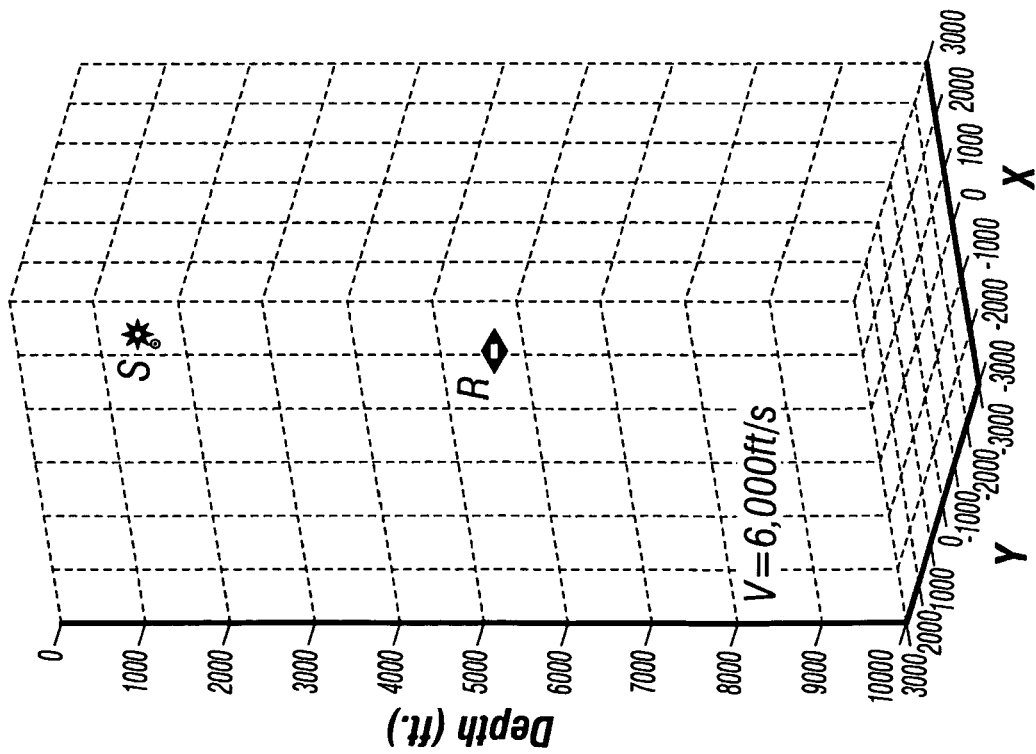
FIG. 7a shows a synthetic survey model with one source and one receiver.
Figure 8C:
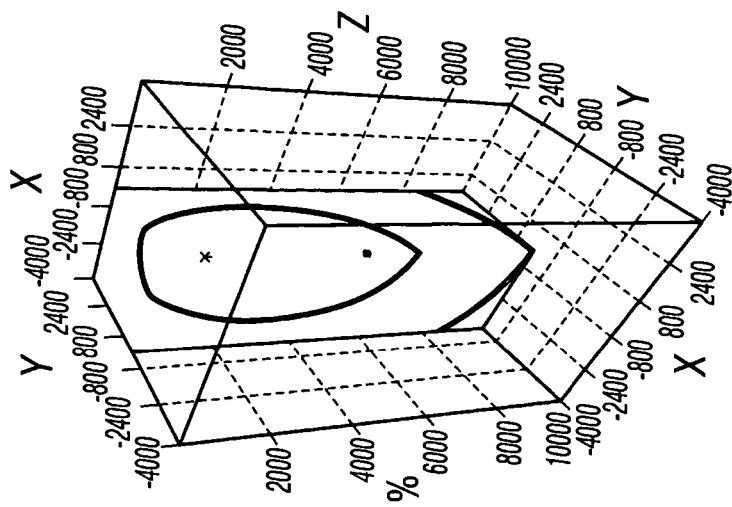
FIGS. 8a-8c are 3D displays of the migrated image for the data in FIG. 7b using the conventional 3D migration method.
Figure 8B:
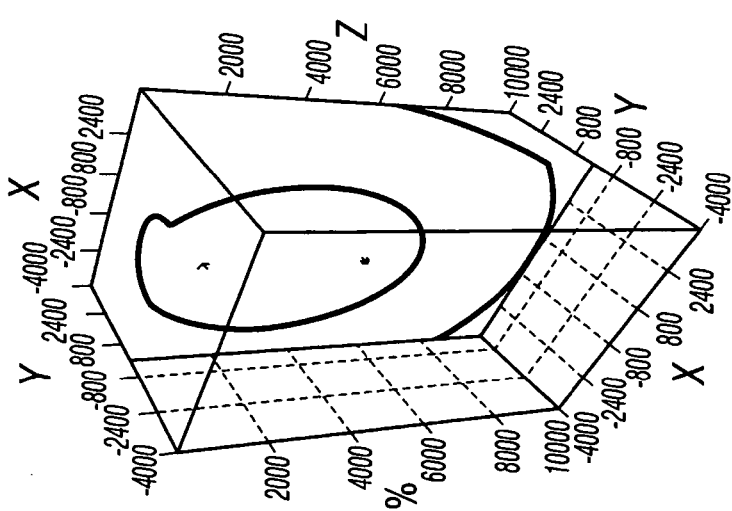
Figure 8A:
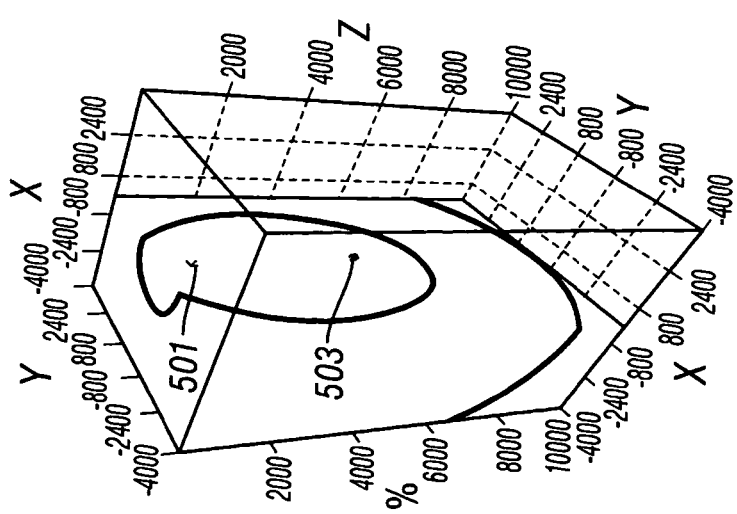

The method of the present invention has been discussed above with reference to data acquired in a VSP survey. In theory, the method could also be used with data recorded at the surface To illustrate the advantages of V3D migration over conventional 1-C, 3-D Kirchhoff prestack migration, we examine the impulse response of the recorded wavelet. For simplicity, a single source-receiver pair is used in a constant background velocity model shown in FIG. 7*a*. The recorded data consists of two 3-component wavelets, one at 1 sec and the other at 2 sec. To clearly illustrate the directional effect of the migration, sample amplitudes of the recorded wavelets are only in x-direction at 1 second and are only in y-direction at 2 seconds as shown in FIG. 7*b*. This corresponds to reflectors in the x-direction and y-direction respectively. Conventional, pre-rotated 3-C or 1-C data migration of these traces result in one or two ellipsoidal surfaces, depending upon on how the data is rotated prior to migration. In any case, the amplitude of each ellipsoidal surface will have constant amplitude. This is of course due to the non-directional distribution of the data in the conventional 3-D migration. The energy is evenly distributed to all ellipsoidal surface points that satisfy the travel time condition for that sample. FIGS. 8*a, b* and *c* show the migrated images of the 3D cross-section displays in the x and y directions using the pre-rotated data in the maximum energy direction. The image amplitudes are identical in x and y sections. The polarities of the amplitude are symmetric to the receiver location which means the energy mapping is non-directional. The source and receiver positions are indicated by 501 and 503.

Figure 9C:
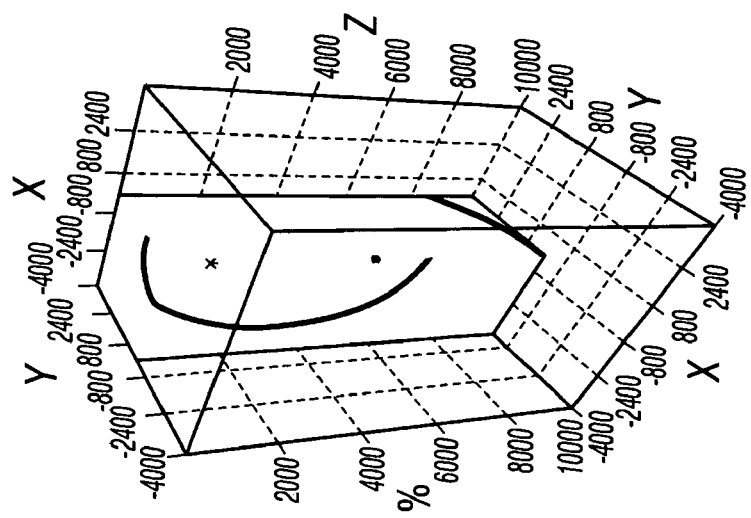
FIGS. 9a-9c are 3D displays of the migrated image for the data in FIG. 7b using the V3D migration method.
Figure 9B:
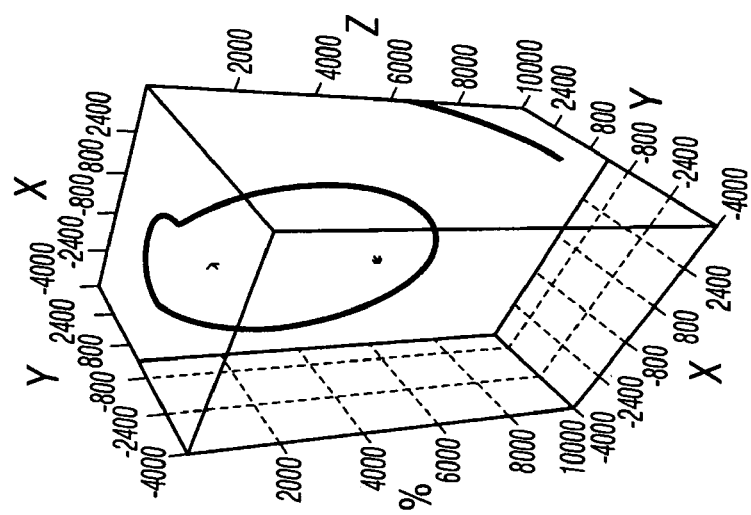
Figure 9A:
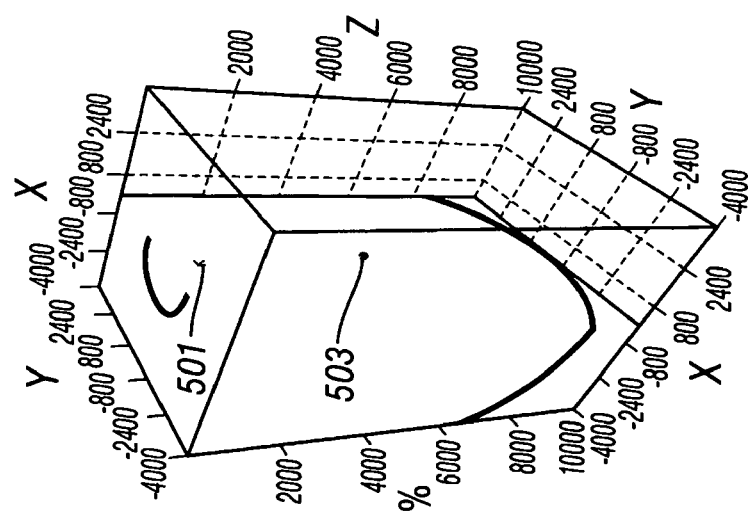

Utilizing the full 3-component data, the migrated image from V3D migration is different. For the wavelet at 1 sec, the amplitude of the migrated image reaches a maximum in the x direction and is zero in the y direction For the wavelet at 2 sec, the amplitude reaches its maximum in the y direction and is zero in the x direction. See FIGS. 9*a-c*. The V3D migration produces a reversed polarity image in the opposite direction to the receiver location from the positive image. This is correct because that reflection response of a reflector with a positive reflectivity in one direction of the receiver is identical to the response of a reflector with a negative reflectivity in a reversed direction to the receiver. A conventional 3-D migration will generate same polarity images along the entire ellipse.

Figure 10A:
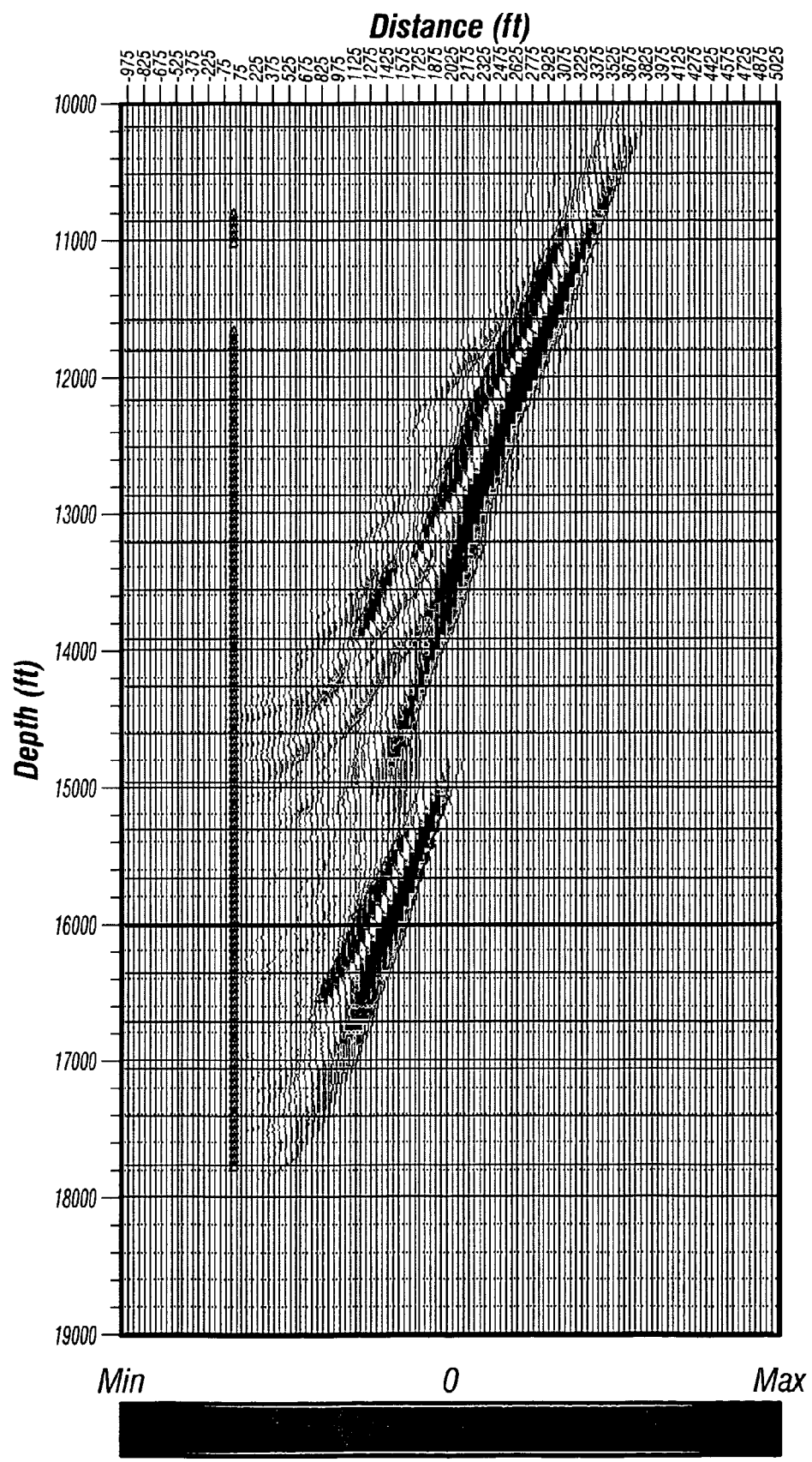
FIGS. 10a-10c show a comparison of results from a 2-D migration, conventional 3-D migration and the full vector 3-C, 3-D migration on field data.
Figure 10B:
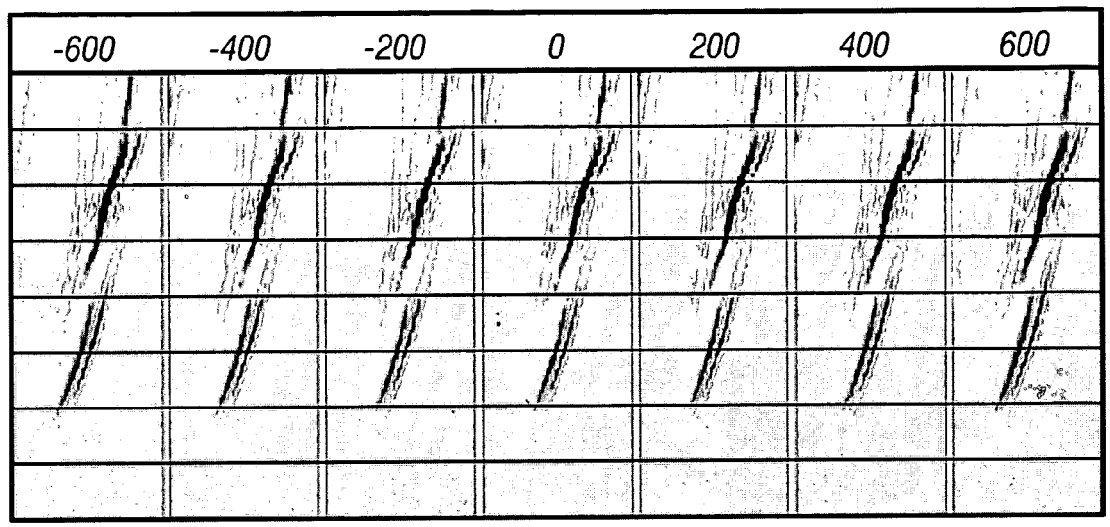
Figure 10C:
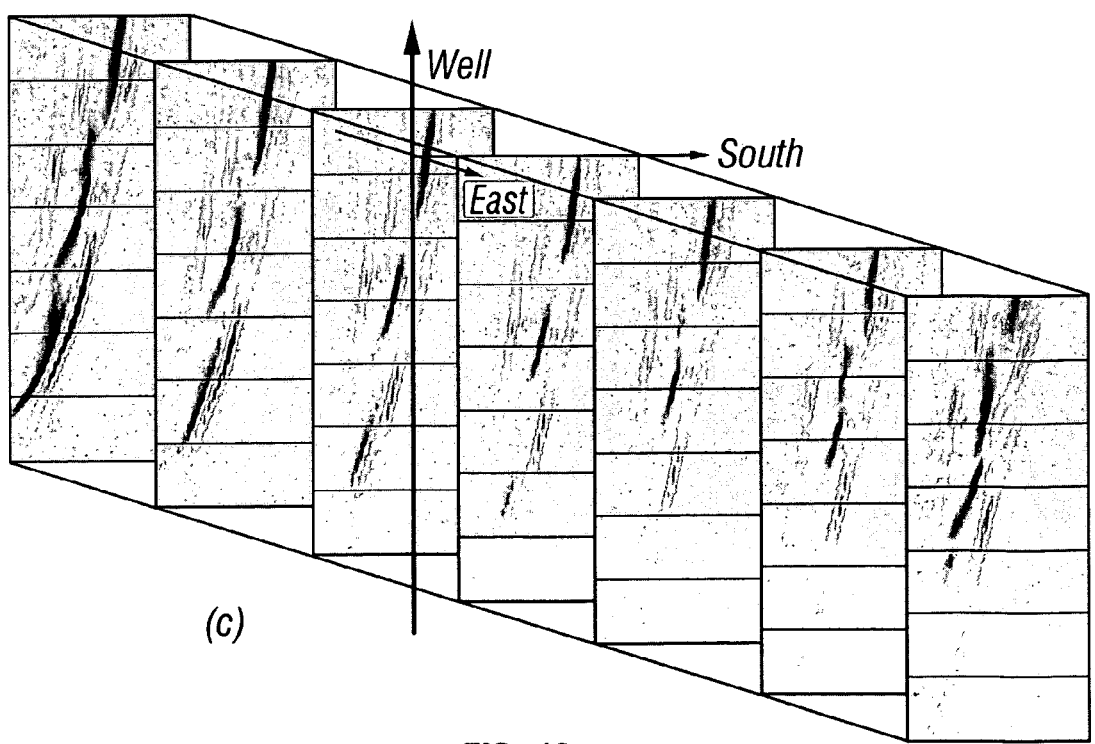
Figure 11:
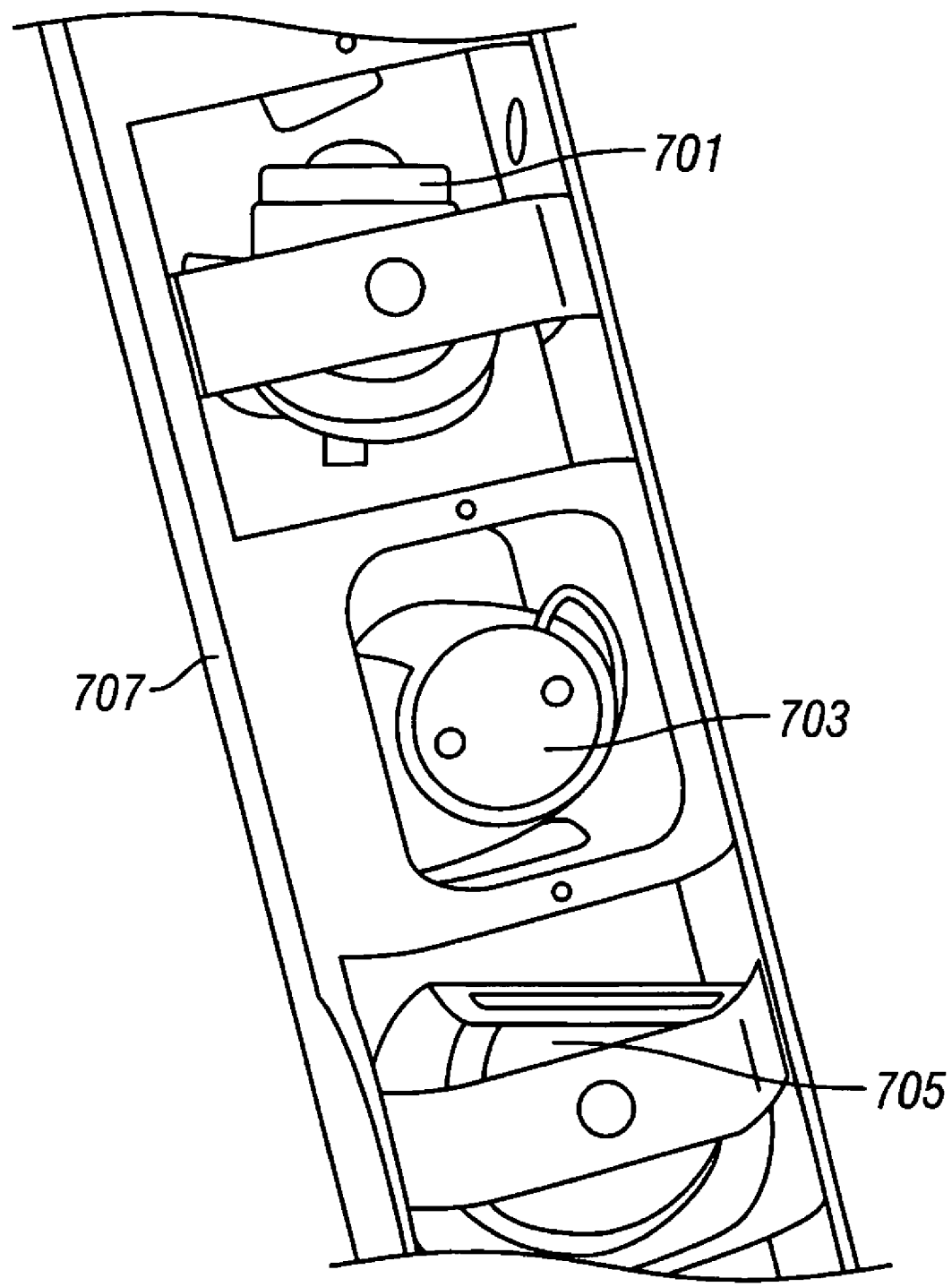
FIG. 11 shows an example of a 3-C gimbal mounted 3-C receiver.

Results from a field example are shown in FIGS. 10*a-*10*c*. FIG. 10*a* is the 2-D migration in the source-receiver plane of conventional 2-D data acquired in the vicinity of a salt dome. The 2-D migrated image is merely a 2-D projection of the 3-D reflections to the source-receiver profile. The image in FIG. 10*b* was obtained from the 3-C, 3-D VSP Kirchhoff migration using the data which were pre-rotated to the maximum energy (the first method discussed above). The migration results for the 3-D salt image do not correctly resolve the off-line salt reflection; the salt image is positioned symmetric to the source-receiver line. This is due to the fact that the non-directional mapping of the reflection data in conventional 3-D migration does not map data to only its original location. It maps the reflection energy symmetrically. Migrating the 3-C data with the vector 3-C, 3-D VSP migration shows a lateral variation of the salt body normal to the source-receiver line (FIG. 10*c*), consistent with the current geologic interpretation.

The method of the present invention has been discussed with reference to a VSP survey carried out on a receiver assembly conveyed on a wireline. However, this is not a limitation on the method of the present invention. The method of the present invention can also be carried out using three component receivers conveyed on a bottomhole assembly (BHA) and surface seismic processing.

Reference has been made to gimbal mounted receivers. An example of a gimbal mounted receiver is shown in FIG. 9 where three sensors 701, 703, 705 are gimbal mounted in an inclined housing 707. The sensor 701 is able to maintain a vertical orientation even though the housing is inclined. Such a configuration is necessary in order to get three components of the seismic field in a fixed reference coordinate system. Orientation of the housing within the borehole may be determined by suitable orientation sensors such as magnetometers.

Baker Hughes Incorporated has a multi-level receiver (MLR) that can be configured from 1 to 13 levels. This greatly speeds up the data acquisition. The downhole receivers can be run in combination with other logging services, either wireline or pipe-conveyed, reducing the number of trips into the well and saving rig time. In high-angle wells, the downhole receiver can be conveyed on drill pipe or coiled tubing and also run in combination with a variety of openhole logging services greatly reducing rig time.

The 3C-3D vector migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, multi-component seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of evaluating an earth formation comprising:
   (a) activating a seismic source at at least one source position and generating seismic waves into said earth formation,
   (b) receiving three components of seismic data at a plurality of receiver positions, the at least one source position and the plurality of receiver positions defining a plurality of source-receiver combinations
   (c) using a vector combination of the three components of the seismic data to define a contribution from each of the plurality of source-receiver combinations to an amplitude of an image at a plurality of image points using traveltimes from the at least one source position to the plurality of image points and traveltimes from the plurality of image points to the plurality of receiver positions;
   (d) combining, at each of the plurality of image points, the contributions to the amplitude from each of the plurality of source-receiver combinations; and
   (e) recording the image obtained by the combination on a suitable medium.

2. The method of claim 1 wherein the at least one source position is at at least one of (i) a surface location, and (ii) a downhole location.

3. The method of claim 1 wherein the three components of seismic data are substantially orthogonal to each other.

4. The method of claim 1 wherein at least one of the plurality of image points is part of a reflecting interface.

5. The method of claim 1 further comprises using a velocity model for obtaining the traveltimes.

6. The method of claim 1 further comprising performing a table lookup for obtaining the traveltimes.

7. The method of claim 1 wherein said generated seismic waves comprise at least one of (i) compressional waves, and, (ii) shear waves.

8. The method of claim 1 wherein the portion of the received seismic data corresponds to at least one of (i) a compressional wave, and, (ii) a shear wave.

9. The method of claim 1 wherein processing the three components of seismic data further comprises rotating the three components of the received seismic data in a specified direction.

10. The method of claim 1 using the vector combination of the three components of seismic data further comprises rotating a vector sum of the three components of said seismic data in a specified direction.

11. The method of claim 1 wherein the plurality of image points are on a grid of output points.

12. The method of claim 1 wherein defining the contribution further comprises applying a correction that is at least one of (i) an amplitude correction, and, (ii) a phase correction.

13. The method of claim 12 wherein the at least one source position further comprises a plurality of additional source positions, the method further comprising repeating (a)-(c) for the plurality of additional source positions.

14. The method of claim 1 wherein the at least one source position further comprises a plurality of additional source positions, the method further comprising repeating (a)-(c) for the plurality of additional source positions.

* * * * *